United States Patent
Chan et al.

(10) Patent No.: US 9,749,770 B2
(45) Date of Patent: Aug. 29, 2017

(54) SELECTIVELY BLOCKING TRAFFIC BASED ON A SET OF RULES ASSOCIATED WITH AN APPLICATION CATEGORY

(71) Applicant: Verizon Patent and Licensing Inc., Arlington, VA (US)

(72) Inventors: Yee Sin Chan, San Jose, CA (US); Raymond So, San Ramon, CA (US); Ye Huang, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/996,543

(22) Filed: Jan. 15, 2016

(65) Prior Publication Data
US 2017/0208419 A1    Jul. 20, 2017

(51) Int. Cl.
*H04W 4/00* (2009.01)
*H04W 28/02* (2009.01)

(52) U.S. Cl.
CPC ....... *H04W 4/003* (2013.01); *H04W 28/0215* (2013.01)

(58) Field of Classification Search
CPC .......................... H04W 4/003; H04W 28/0215
See application file for complete search history.

(56) References Cited

U.S. PATENT DOCUMENTS

| | | | | |
|---|---|---|---|---|
| 2009/0285201 | A1* | 11/2009 | Ben-Haim | H04L 12/66 370/352 |
| 2011/0314145 | A1* | 12/2011 | Raleigh | H04L 41/0893 709/224 |
| 2013/0031191 | A1* | 1/2013 | Bott | G06F 21/552 709/206 |
| 2013/0294250 | A1* | 11/2013 | Berelejis | H04L 47/193 370/236 |
| 2014/0337520 | A1* | 11/2014 | Raleigh | H04L 67/2804 709/224 |
| 2014/0373095 | A1* | 12/2014 | Yoon | H04L 63/10 726/3 |
| 2016/0212653 | A1* | 7/2016 | Wang | A61B 10/0051 |

OTHER PUBLICATIONS

3rd Generation Partnership Project, "3GPP TS 22.101 V13.7.0 (Dec. 2015): 3rd Generation Partnership Project; Technical Specification Group Services and System Aspects; Service aspects; Service principles (Release 13)," Dec. 17, 2015, 92 pages.

* cited by examiner

*Primary Examiner* — Kashif Siddiqui

(57) ABSTRACT

A device may receive a request for a transmission of traffic from an application, the application being associated with an application identifier. The device may determine an application category of the application using the application identifier associated with the application. The device may identify a set of rules associated with the application category, where the set of rules includes at least one of one or more rules associated with foreground traffic, or one or more rules associated with background traffic. The device may selectively block or permit the transmission of traffic, from the application, based on the set of rules.

20 Claims, 7 Drawing Sheets

SELECTIVELY BLOCKING TRAFFIC BASED ON A SET OF RULES ASSOCIATED WITH AN APPLICATION CATEGORY

BACKGROUND

A user equipment may be associated with an application, which may include a computer or software program designed to execute on a mobile device. The user equipment may transmit traffic via a network. In some cases, the user equipment may transmit traffic associated with the application. The user equipment may transmit the traffic from the user equipment to a destination via a base station.

DETAILED DESCRIPTION OF PREFERRED EMBODIMENTS

The following detailed description of example implementations refers to the accompanying drawings. The same reference numbers in different drawings may identify the same or similar elements.

An application (e.g., a mobile application) may be associated with a user equipment. For example, the application may be installed on the user equipment, the application may execute on the user equipment, the application may execute remotely from the user equipment, or the like. The user equipment may transmit (e.g., permit, allow, not block, etc.) traffic, such as packets, as foreground traffic or background traffic associated with the application via a network (e.g., a mobile network, a cellular network, etc.). For example, the user equipment may transmit traffic such as requests from the application for software updates, short message services (SMS) messages, requests from the application for content, or the like.

The traffic may include foreground traffic where, for example, a user of the user equipment has initiated a transmission of the traffic, such as by interacting with the application and/or the user equipment (e.g., using an interface, inputting data, etc.). Additionally, or alternatively, the traffic may include background traffic where, for example, the user of the user equipment has not initiated the transmission of the traffic or where a screen lock and/or a keypad lock of the user equipment are activated (e.g., locked) when the user initiates the transmission of the traffic.

In some cases, multiple user equipment may transmit traffic via the network. The traffic from the user equipment, in aggregate, may be associated with network congestion, where a quality of service of the network (e.g., packet delivery) deteriorates from the aggregated traffic. In some cases, the network congestion may prevent the traffic from reaching an intended destination (e.g., via packet loss), which may decrease a performance of the network.

Implementations described herein enable a user equipment to selectively block (e.g., prevent, restrict, delay, etc.) and/or transmit traffic associated with an application using a set of rules associated with an application category of the application, such as when an amount of network congestion satisfies a threshold level. In this way, the user equipment may conserve network resources of the network (e.g., bandwidth, channels, timeslots, or the like), reduce network congestion, increase a quality of service of the network, and increase a performance of the network, by preventing the user equipment from transmitting traffic via the network, such as when an amount of network congestion satisfies a threshold.

Figure 1A:
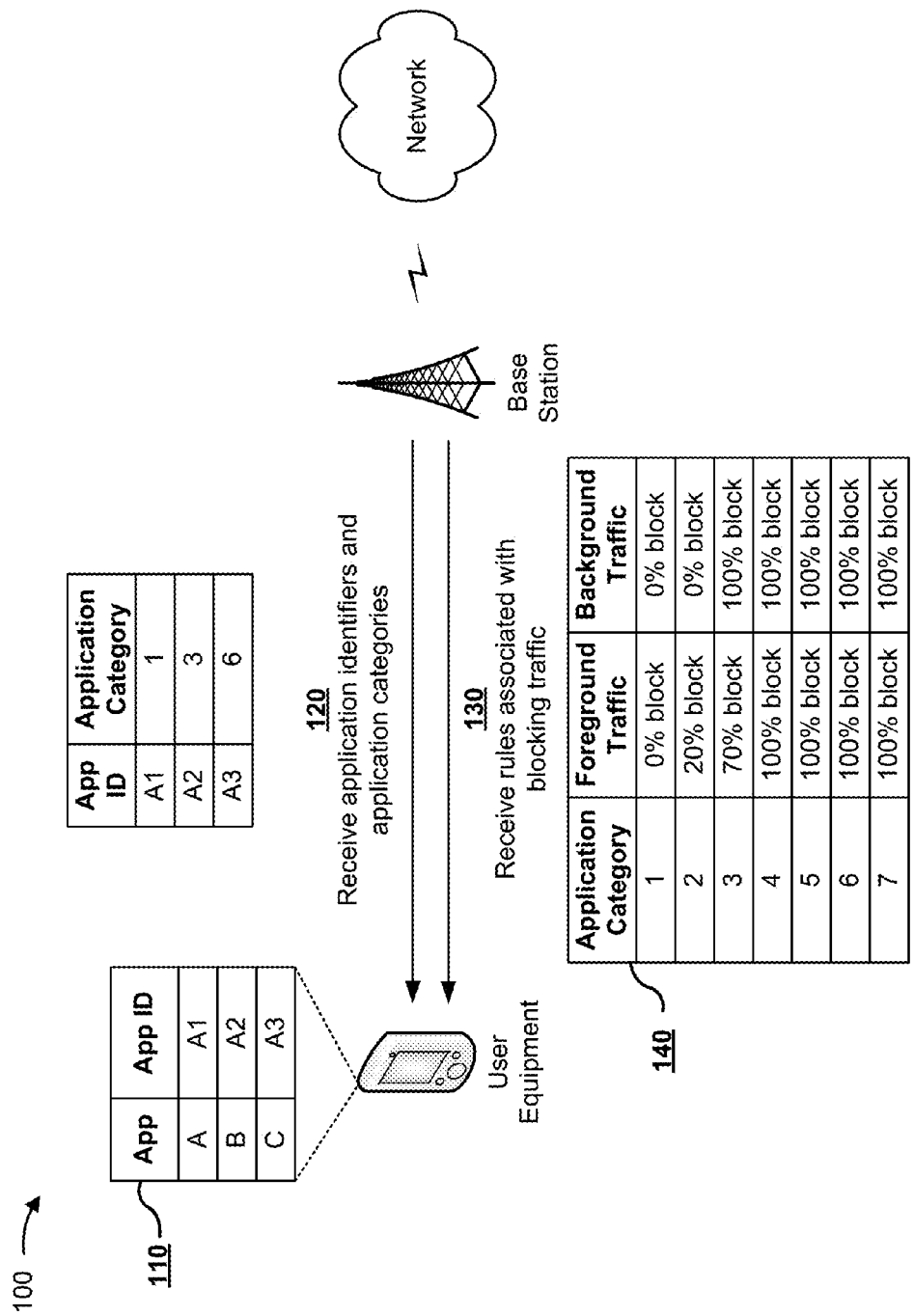
FIGS. 1A and 1B are diagrams of an overview of an example implementation described herein.
Figure 1B:
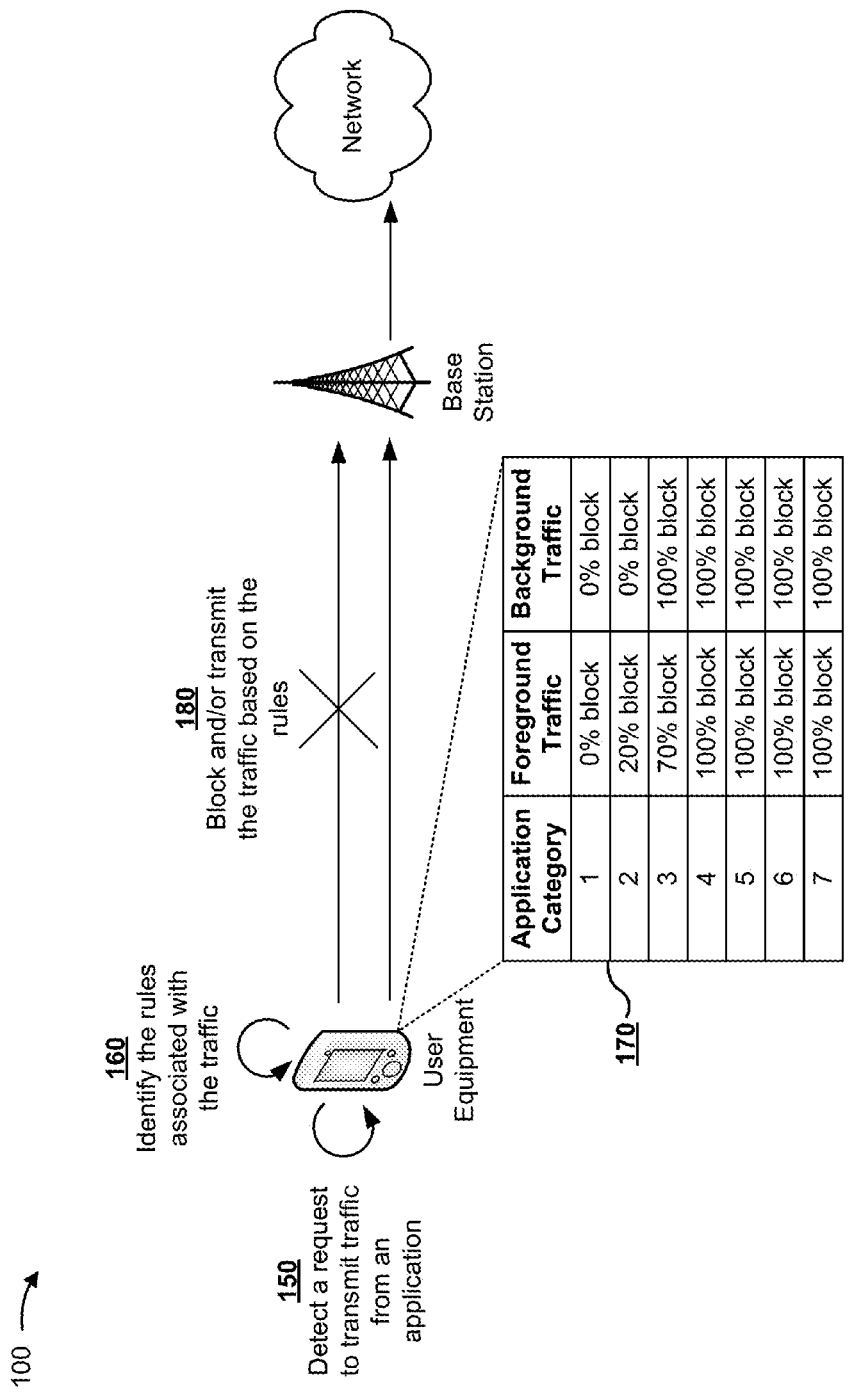

FIGS. 1A and 1B are diagrams of an overview of an example implementation 100 described herein. As shown in FIG. 1A, and by reference number 110, the user equipment, such as a mobile phone, a tablet, or the like, may be associated with one or more applications ("App") (e.g., shown as "A," "B," and "C"). For example, the applications may include applications installed on the user equipment. As further shown by reference number 110, the applications may be associated with an application identifier ("App ID") (e.g., shown as "A1," "A2," and "A3"). The application identifier may include a value, such as a number, a string, or the like, which may uniquely identify an application.

As shown by reference number 120, the user equipment may receive, from a base station, application identifiers and application categories ("Application Category") (e.g., shown as "1," "3," and "6"). For example, the user equipment may receive a set of application identifiers and corresponding application categories. In some implementations, the user equipment may use the set of application identifiers and corresponding application categories to determine the application categories of the applications. For example, the user equipment may compare the application identifiers associated with the applications (as shown by reference number 110) and the application identifiers included in the set of application identifiers and corresponding application categories received from the base station (as shown by reference number 120).

In some cases, where the comparison indicates a match between the application identifiers, the user equipment may identify the corresponding application categories as the application categories of the applications. For example, the user equipment may identify application category 6 as the application category of application C by matching the A3 associated with the application C to the A3 included in the set of application identifiers and corresponding application categories received from the base station.

As shown by reference number 130, the user equipment may receive rules associated with blocking traffic. In some cases, the user equipment may receive the rules from the base station after receiving the set of application identifiers and corresponding application categories. A network device, associated with the network, may generate the rules based on an amount of network congestion in the network. The network device may transmit (e.g., broadcast, multicast, unicast, etc.) the rules to user equipment connected to the base station. As a result, all, or a subset, of the user equipment connected to the base station may receive the rules.

As shown by reference number 140, the rules may be associated with an application category ("Application Category") (e.g., shown as "1," "2," "3," etc.) and may be associated with foreground traffic ("Foreground Traffic") or background traffic ("Background Traffic"). The rules (e.g., shown as "0% block," "20% block," "100% block," etc.) may indicate an aggregate amount of traffic (e.g., a percentage of traffic, a threshold number, a number, etc.) associated with the application categories that a network operator desires to block and/or transmit.

For example, in example implementation 100, the rules may indicate that the network operator desires to block twenty percent (e.g., 20%, where "%" corresponds to "percent") of aggregated foreground traffic associated with application category 2 applications (e.g., shown as "20% block"). Additionally, for example, the rules may indicate that the network operator desires to block zero percent of aggregated background traffic associated with application category 2 applications (e.g., shown as "0% block").

As shown in FIG. 1B, and by reference number 150, the user equipment may detect a request to transmit traffic from an application. For example, the request from the application may be associated with foreground traffic or background traffic to be transmitted by the application. As shown by reference number 160, the user equipment may identify the rules associated with the traffic after receiving the request to transmit the traffic. For example, the user equipment may use the application categories associated with the applications to identify the rules associated with the application transmitting the traffic, by comparing the application categories associated with the applications and the application categories associated with the rules (as shown by reference number 170).

As shown by reference number 180, the user equipment may block and/or transmit the traffic based on the rules and/or based on whether the application seeks to transmit foreground traffic or background traffic. In some implementations, the user equipment may determine whether to block or transmit foreground traffic or background traffic for the application based on identifying the rules associated with the application categories of the applications, as described below. After determining whether to block or transmit the foreground traffic and/or the background traffic, the user equipment may selectively block and/or transmit the traffic.

In this way, a user equipment may block and/or transmit traffic, such as foreground traffic and/or background traffic, using rules associated with an application category of an application transmitting the traffic. This may conserve network resources by preventing the transmission of the traffic when, for example, network congestion in a network satisfies a threshold. Additionally, or alternatively, blocking the transmission of the traffic may reduce network congestion, increase a quality of service of the network, and increase a performance of the network, by preventing the transmission of the traffic.

As indicated above, FIGS. 1A and 1B are provided merely as an example. Other examples are possible and may differ from what was described with regard to FIGS. 1A and 1B.

Figure 2:
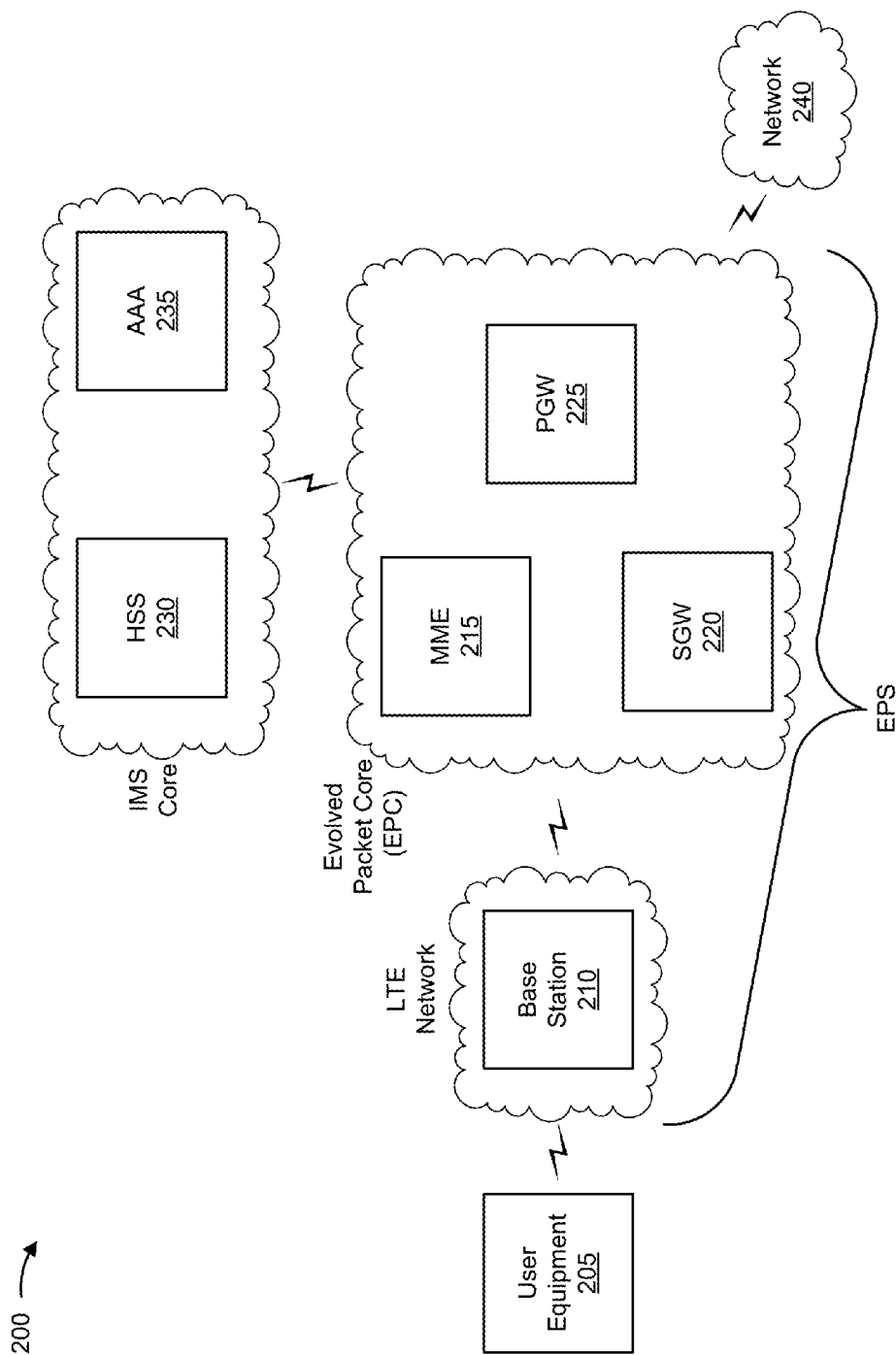
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user equipment 205, a base station 210, a mobility management entity device (MME) 215, a serving gateway (SGW) 220, a packet data network gateway (PGW) 225, a home subscriber server (HSS) 230, an authentication, authorization, and accounting server (AAA) 235, and a network 240. Devices of environment 200 may interconnect via wired connections, wireless connections, or a combination of wired and wireless connections.

Some implementations are described herein as being performed within a long term evolution (LTE) network for explanatory purposes. Some implementations may be performed within a network that is not an LTE network, such as a third generation (3G) network or a code division multiple access (CDMA) network.

Environment 200 may include an evolved packet system (EPS) that includes an LTE network and/or an evolved packet core (EPC) that operate based on a third generation partnership project (3GPP) wireless communication standard. The LTE network may include a radio access network (RAN) that includes one or more base stations 210 that take the form of evolved Node Bs (eNBs) via which user equipment 205 communicates with the EPC. The EPC may include MME 215, SGW 220, and/or PGW 225 that enable user equipment 205 to communicate with network 240 and/or an Internet protocol (IP) multimedia subsystem (IMS) core. The IMS core may include HSS 230 and/or AAA 235, and may manage device registration and authentication, session initiation, etc., associated with user equipment 205. HSS 230 and/or AAA 235 may reside in the EPC and/or the IMS core.

User equipment 205 may include one or more devices capable of communicating with base station 210 and/or a network (e.g., network 240). For example, user equipment 205 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, a wearable communication device (e.g., a smart wrist watch, a pair of smart eyeglasses, etc.), and/or a similar device. User equipment 205 may send traffic to and/or receive traffic from network 240 (e.g., via base station 210, SGW 220, and/or PGW 225).

Base station 210 may include one or more devices capable of transferring traffic, such as audio, video, text, and/or other traffic, destined for and/or received from user equipment 205. In some implementations, base station 210 may include an eNB associated with the LTE network that receives traffic from and/or sends traffic to network 240 via SGW 220 and/or PGW 225. Additionally, or alternatively, one or more base stations 210 may be associated with a RAN that is not associated with the LTE network. Base station 210 may send traffic to and/or receive traffic from user equipment 205 via an air interface. In some implementations, base station 210 may include a small cell base station, such as a base station of a microcell, a picocell, and/or a femtocell.

MME 215 may include one or more devices, such as one or more server devices, capable of managing authentication, activation, deactivation, and/or mobility functions associated with user equipment 205. In some implementations, MME 215 may perform operations relating to authentication of user equipment 205. Additionally, or alternatively, MME 215 may facilitate the selection of a particular SGW 220 and/or a particular PGW 225 to serve traffic to and/or from user equipment 205. MME 215 may perform operations associated with handing off user equipment 205 from a first base station 210 to a second base station 210 when user equipment 205 is transitioning from a first cell associated with the first base station 210 to a second cell associated with the second base station 210. Additionally, or alternatively, MME 215 may select another MME (not pictured), to which user equipment 205 should be handed off (e.g., when user equipment 205 moves out of range of MME 215).

SGW 220 may include one or more devices capable of routing packets. For example, SGW 220 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 220 may aggregate traffic received from one or more base stations 210 associated with the LTE network, and may send the aggregated traffic to network 240 (e.g., via PGW 225) and/or other network devices associated with the EPC and/or the IMS core. SGW 220 may also receive traffic from network 240 and/or other network devices, and may send the received traffic to user equipment 205 via base station 210. Additionally, or alternatively, SGW 220 may perform operations associated with handing off user equipment 205 to and/or from an LTE network.

PGW 225 may include one or more devices capable of providing connectivity for user equipment 205 to external packet data networks (e.g., other than the depicted EPC and/or LTE network). For example, PGW 225 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 225 may aggregate traffic received from one or more SGWs 220, and may send the aggregated traffic to network 240. Additionally, or alternatively, PGW 225 may receive traffic from network 240, and may send the traffic to user equipment 205 via SGW 220 and base station 210. PGW 225 may record data usage information (e.g., byte usage), and may provide the data usage information to AAA 235.

HSS 230 may include one or more devices, such as one or more server devices, capable of managing (e.g., receiving, generating, storing, processing, and/or providing) information associated with user equipment 205. For example, HSS 230 may manage subscription information associated with user equipment 205, such as information that identifies a subscriber profile of a user associated with user equipment 205, information that identifies services and/or applications that are accessible to user equipment 205, location information associated with user equipment 205, a network identifier (e.g., a network address) that identifies user equipment 205, information that identifies a treatment of user equipment 205 (e.g., quality of service information, a quantity of minutes allowed per time period, a quantity of data consumption allowed per time period, etc.), and/or similar information. HSS 230 may provide this information to one or more other devices of environment 200 to support the operations performed by those devices.

AAA 235 may include one or more devices, such as one or more server devices, that perform authentication, authorization, and/or accounting operations for communication sessions associated with user equipment 205. For example, AAA 235 may perform authentication operations for user equipment 205 and/or a user of user equipment 205 (e.g., using one or more credentials), may control access, by user equipment 205, to a service and/or an application (e.g., based on one or more restrictions, such as time-of-day restrictions, location restrictions, single or multiple access restrictions, read/write restrictions, etc.), may track resources consumed by user equipment 205 (e.g., a quantity of voice minutes consumed, a quantity of data consumed, etc.), and/or may perform similar operations.

Network 240 may include one or more wired and/or wireless networks. For example, network 240 may include a cellular network (e.g., an LTE network, a 3G network, a CDMA network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
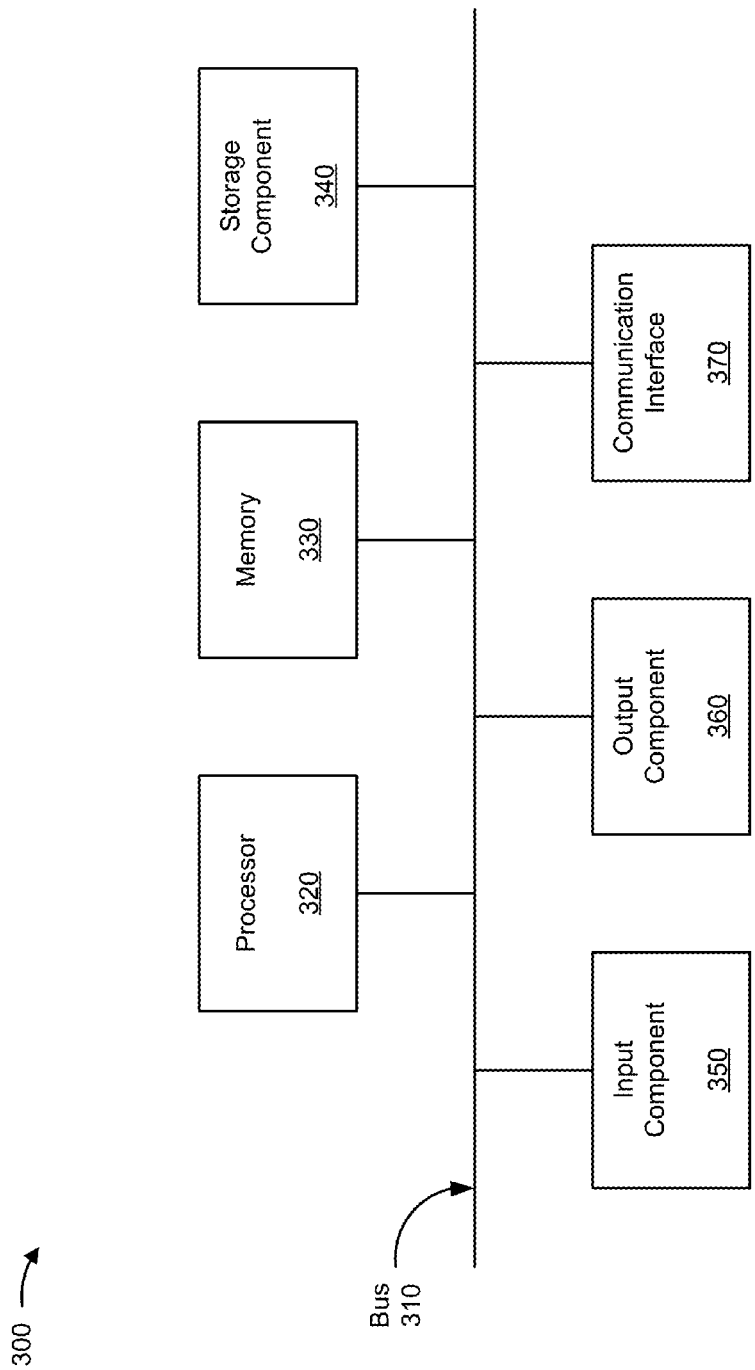
FIG. 3 is a diagram of example components of one or more devices of FIG. 2.

FIG. 3 is a diagram of example components of a device 300. Device 300 may correspond to user equipment 205, base station 210, MME 215, SGW 220, PGW 225, HSS 230, and/or AAA 235. In some implementations, user equipment 205, base station 210, MME 215, SGW 220, PGW 225, HSS 230, and/or AAA 235 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors capable of being programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of non-transitory computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
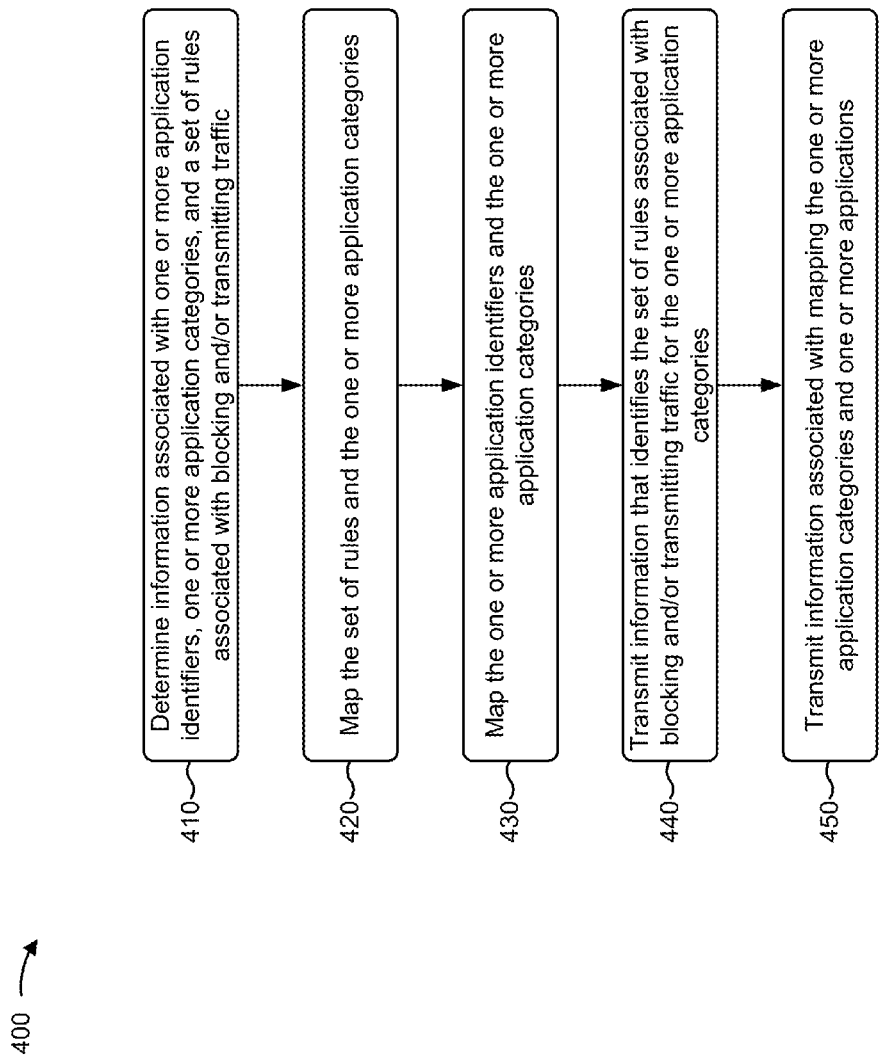
FIG. 4 is a flow chart of an example process for mapping a set of rules and one or more application categories and/or for mapping one or more application identifiers and one or more application categories.

FIG. 4 is a flow chart of an example process 400 for mapping (e.g., identifying, associating, etc.) one or more rules associated with blocking and/or transmitting traffic and one or more application categories and/or for mapping one or more application identifiers and the one or more application categories. In some implementations, one or more process blocks of FIG. 4 may be performed by a network device, such as base station 210, MME 215, SGW 220, PGW 225, HSS 230, and/or AAA 235.

As shown in FIG. 4, process 400 may include determining information associated with one or more application identifiers, one or more application categories, and a set of rules associated with blocking and/or transmitting traffic (block 410). For example, a network device may receive the information from a network operator or a device associated with the network operator (e.g., a network management device). In some implementations, the network device may be configured with the information, such as a stored set of default rules or default application categories. Additionally, or alternatively, the network device may store the application identifiers after user equipment 205 connects to a network (e.g., the LTE network, the EPS, etc.).

As further shown in FIG. 4, process 400 may include mapping the set of rules and the one or more application categories (block 420). For example, the device may identify a set of application categories and corresponding rules by associating the rules with the application categories. In some implementations, multiple application categories may be associated with a single rule. Additionally, or alternatively, multiple rules may be associated with a single application category. In some implementations, the network device may map the rules and the application categories using information or instructions received from the network, received from another device, and/or stored on the network device.

As described in more detail in connection with FIG. 5, the set of rules may indicate an amount of foreground traffic and/or background traffic, associated with one or more application categories, to be blocked and/or to be transmitted by user equipment 205 (e.g., when the network is congested). Additionally, as described in more detail in connection with FIG. 5, the application categories may indicate a network operator identification associated with an application, a purpose of the application, an importance level of the application, or the like.

As further shown in FIG. 4, process 400 may include mapping the one or more application identifiers and the one or more application categories (block 430). For example, the network device may identify a set of application identifiers and corresponding application categories by associating the application identifiers with the application categories. In some implementations, multiple application identifiers may be associated with an application category. Additionally, or alternatively, a single application identifier may be associated with multiple application categories.

In some implementations, the network device may map the application identifiers and the application categories using information or instructions received from the network, received from another device, and/or stored on the network device. In some implementations, an application identifier may uniquely identify an application.

As further shown in FIG. 4, process 400 may include transmitting information that identifies the set of rules associated with blocking and/or transmitting traffic for the one or more application categories (block 440). For example, the network device may transmit (e.g., broadcast, multicast, unicast, etc.) the information that identifies the set of rules after mapping the set of rules and the corresponding application categories. In some implementations, the set of rules may be associated with blocking and/or transmitting (e.g., allowing, permitting, not blocking, etc.) foreground traffic and/or background traffic. In some implementations, the network device may transmit the set of rules to a particular user equipment 205 connected to the network. In some implementations, the network device may broadcast the set of rules to multiple user equipment 205 connected to the network.

As further shown in FIG. 4, process 400 may include transmitting information associated with mapping the one or more application categories and one or more applications (block 450). For example, the network device may transmit the set of application identifiers and corresponding application categories after mapping the application identifiers and the application categories. In some implementations, the device may transmit the set of application identifiers and corresponding application categories to one or more user equipment 205. In some implementations, a user equipment 205 may use the set of application categories and corresponding application identifiers to map the one or more applications associated with user equipment 205 and the application categories, as described below.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
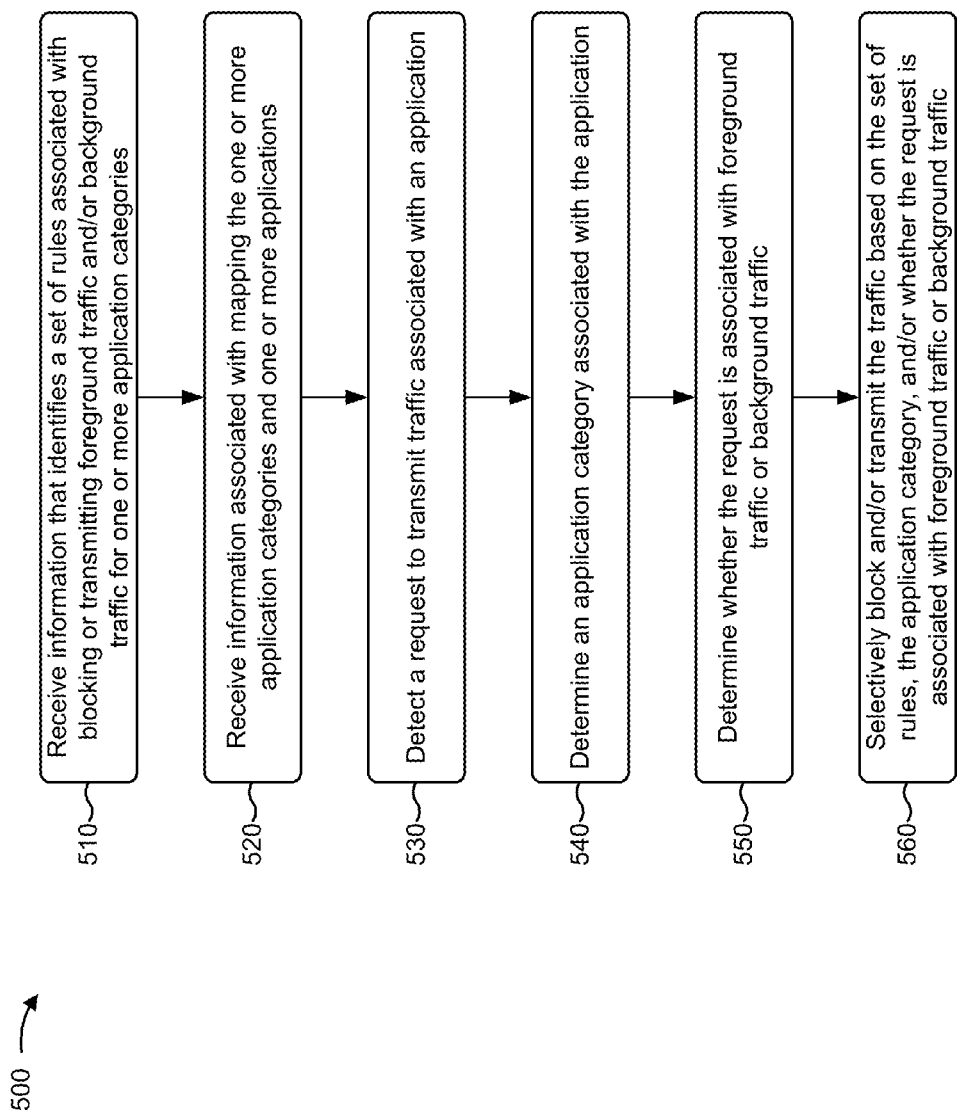
FIG. 5 is a flow chart of an example process for selectively blocking and/or transmitting traffic based on a set of rules associated with an application category.

FIG. 5 is a flow chart of an example process 500 for selectively blocking and/or transmitting traffic based on a set of rules associated with an application category. In some implementations, one or more process blocks of FIG. 5 may be performed by user equipment 205. In some implementations, one or more process blocks of FIG. 5 may be performed by another device or a group of devices separate from or including user equipment 205, such as base station 210, MME 215, SGW 220, PGW 225, HSS 230, and/or AAA 235.

As shown in FIG. 5, process 500 may include receiving information that identifies a set of rules associated with blocking or transmitting foreground traffic and/or background traffic for one or more application categories (block 510). For example, user equipment 205 may identify rules that indicate an amount (e.g., a percentage, a quantity, etc.) of foreground traffic and/or background traffic that the network operator desires to block (e.g., restricted, prevented, etc.) or to transmit (permit, allow, send, not block, etc.). For example, the amount may include a percentage, such as 20%, where "%" corresponds to "percent," that indicates that the network operator desires to block and/or to transmit 20% of the traffic on the network associated with one or more application categories.

In some implementations, the amount may be expressed as a percentage, such as 20%, 35.5%, or the like. In some implementations, the amount may be expressed as a decimal number, such as 0.20, 0.355, or the like. In some implementations, the rules may include a combination of positive numbers (e.g., 20%, 35.5%, 0.20, 0.355, etc.) and/or negative numbers (e.g., −20%, −35.5%, −0.20, −0.355, etc.) indicating an amount of foreground traffic and/or background traffic to transmit (e.g., using a positive number) or to block (e.g., using a negative number).

In some implementations, user equipment 205 may receive the rules from a network device associated with the network (e.g., base station 210, MME 215, HSS 230, or the like associated with the LTE network and/or EPS). Additionally, or alternatively, user equipment 205 may receive the rules from a network device connected to network 240. Additionally, or alternatively, user equipment 205 may receive the rules from a user of user equipment 205 (e.g., via an input of the user). In some implementations, user equipment 205 may receive the rules in one or more other manners or from one or more other sources (e.g., different from receiving the rules from the network device, the user, etc.).

In some implementations, the set of rules may indicate an amount of the aggregated foreground traffic and/or the aggregated background traffic associated with an application category that a network operator desires to block or to transmit on the network (e.g., the LTE network, the EPS, etc.). For example, the rules may indicate that the network operator is not blocking the foreground traffic and/or the background traffic on the network (e.g., zero percent block). Additionally, or alternatively, the rules may indicate that the network operator is blocking all of the foreground traffic and/or the background traffic on the network (e.g., 100% block).

Additionally, or alternatively, the rules may indicate that the network operator desires to block a portion of the foreground traffic (e.g., 20% block) and not to block any portion of the background traffic (e.g., 0% block) on the network. Additionally, or alternatively, the rules may indicate one or more other combinations of percentages of blocking and/or transmitting foreground traffic and/or background traffic on the network. In some implementations, user equipment 205 may determine whether to block or to transmit the foreground traffic and/or the background traffic for an application based on using the rules, as described below.

In some implementations, the rules may be associated with one or more application categories. For example, a first rule may be associated with a first application category. Additionally, or alternatively, a second rule (e.g., different from the first rule) may be associated with a second application category (e.g., different from the first application category). In some implementations, the rules may be based on one or more network conditions. For example, the rules may be based on a threshold level of network interference (e.g., a radio interference), a threshold amount of network congestion (e.g., an amount of traffic on the network), a quantity of devices connected to the network, a quantity of devices connected to base station 210, or the like.

As further shown in FIG. 5, process 500 may include receiving information associated with mapping the one or more application categories and one or more applications (block 520). For example, user equipment 205 may receive information that identifies one or more application categories and one or more applications associated with the application categories. In some implementations, an identifier (e.g., a value, such as a string, a number, etc.), such as an application identifier that identifies the application, may be associated with an identifier that identifies an application category, such as an application category identifier.

In some implementations, one or more applications may be associated with an application category. For example, a first application and a second application may be associated with a first application category. Additionally, or alternatively, a particular application may be associated with one or more application categories. For example, an application may be associated with a first application category and a second application category.

In some implementations, the applications may be associated with an application category based on one or more factors. For example, the applications may be associated with an application category based on a network operator identification, such as emergency related applications, disaster related applications, network maintenance related applications, or the like. Additionally, or alternatively, the applications may be associated with an application category based on a purpose of the application (e.g., a use or a service of the application), such as video service applications, web service applications, health related applications, social media applications, or the like.

Additionally, or alternatively, the applications may be associated with a data size of the traffic associated with the application, such as small data usage applications (e.g., voice related applications, short message services (SMS) applications, multimedia message services (MMS) applications, machine-to-machine related applications, or the like). In some implementations, applications not otherwise associated with a category may be associated with a residual category (e.g., a catch-all category).

In some implementations, an application category may be associated with an importance level of the associated applications. For example, a first application category may be associated with high importance level applications, such as network operator identified applications (e.g., emergency related applications, etc.) and a second application category may be associated with medium importance level or low importance level applications (e.g., video service applications, web service applications, etc.).

In some implementations, user equipment 205 may map the applications and the application categories without receiving mapping information from the network. For example, rather than receiving information from the network, such as information identifying the application categories associated with the application identifiers, user equipment 205 may receive a set of application categories without additional associated information. In this case, user equipment 205 may map the applications and the application categories using the set of application categories from the network.

As further shown in FIG. 5, process 500 may include detecting a request to transmit traffic associated with an application (block 530). For example, user equipment 205 may receive a request from the application indicating that the application has traffic to transmit. In some implementations, the request from the application may be associated with foreground traffic or background traffic. User equipment 205 may classify the request as being related to foreground traffic or background traffic.

As further shown in FIG. 5, process 500 may include determining an application category associated with the application (block 540). For example, user equipment 205 may compare the application identifier associated with the application and a set of application identifiers and corresponding application categories. In some implementations, where the comparison indicates a match, user equipment 205 may determine that the corresponding application category is the application category of the application.

In some implementations, the application category may be associated with one or more rules for blocking and/or transmitting foreground traffic and/or background traffic. In some cases, where the rules indicate that the network operator desires to block or not to block all of the traffic associated with an application category, regardless of whether the traffic is foreground traffic or background traffic, user equipment 205 may block or not block the traffic without determining whether the traffic is foreground traffic or background traffic, as described below. Additionally, or alternatively, the one or more rules may be associated with an application category, without being associated with foreground traffic or background traffic.

In this way, processor resources of the user equipment are conserved by blocking traffic when the rules associated with an application category indicate that the network operator desires to block or not to block all of the traffic associated with the application category, regardless of whether the traffic is foreground traffic or background traffic, by preventing the device from determining whether the traffic is foreground traffic or background traffic, as described below.

As further shown in FIG. 5, process 500 may include determining whether the request is associated with foreground traffic or background traffic (block 550). For example, user equipment 205 may determine that the request to transmit the traffic from the application is associated with foreground traffic or background traffic after detecting the request to transmit the traffic. In some implementations, when determining whether the traffic is foreground traffic or background traffic, user equipment 205 may determine information associated with the traffic, the transmission of the traffic, and/or the request associated with the transmission of the traffic.

For example, user equipment 205 may determine whether the traffic is user-initiated traffic or network-initiated and/or application-initiated traffic. In some implementations, user equipment 205 may determine that the traffic is foreground traffic when the traffic is user-initiated traffic, such as traffic initiated by user interaction with equipment 205 and/or the application (e.g., using an interface, inputting data, etc.). In some implementations, user equipment 205 may determine that the traffic is background traffic when the traffic is application-initiated traffic and/or network-initiated traffic, such as when the user of user equipment 205 did not initiate the traffic via interaction with the application and/or user equipment 205.

As another example, user equipment 205 may determine whether a screen (e.g., display) lock and/or a keypad lock of user equipment 205 were activated or deactivated (e.g., locked or unlocked) when the application initiated the transmission of the traffic. In some implementations, user equipment 205 may determine that the traffic is foreground traffic when the screen lock and/or the keypad lock were deactivated when the application initiated the transmission of the traffic. In some implementations, user equipment 205 may determine that the traffic is background traffic when the screen lock and/or the keypad lock were activated when the application initiated the transmission of the traffic.

As another example, user equipment 205 may determine whether a length of time since user equipment 205 last received user input and/or detected user interaction with user equipment 205 and/or the application satisfies a threshold. In some implementations, user equipment 205 may determine that the traffic is foreground traffic when the length of time does not satisfy a threshold length of time. In some implementations, user equipment 205 may determine that the traffic is background traffic when the length of time satisfies the threshold length of time.

As another example, user equipment 205 may determine whether the application associated with the request was open or not open (e.g., closed), such as providing or not providing an interface for display to user equipment 205, when the application requested to transmit the traffic. In some implementations, user equipment 205 may determine that the traffic is foreground traffic when the application was open when the application requested to transmit the traffic. In some implementations, user equipment 205 may determine that the traffic is background traffic when the application was closed when the application requested to transmit the traffic.

As another example, user equipment 205 may determine whether the traffic associated with the transmission is a type of traffic that user equipment 205 restricts when background traffic transmissions, such as checking for application software updates, requesting application information feed updates, or the like are disabled (e.g., prevented, blocked, etc.) for user equipment 205, such as via user settings (e.g., configurations, options, controls, etc.) associated with user equipment 205.

In some implementations, user equipment 205 may determine that the traffic is foreground traffic when the traffic is not the type of traffic that user equipment 205 restricts when disabling background traffic transmissions. In some implementations, user equipment 205 may determine that the traffic is background traffic when the traffic is the type of traffic that user equipment 205 restricts when disabling background traffic transmissions.

In this way, processor resources and memory resources of a user equipment, and network resources of a network, are conserved by determining whether to transmit traffic via the network, such as when a set of rules indicates blocking or transmitting foreground traffic and/or background traffic.

As further shown in FIG. 5, process 500 may include selectively blocking and/or transmitting the traffic based on the set of rules, the application category, and/or whether the request is associated with foreground traffic or background traffic (block 560). For example, in some implementations, user equipment 205 may determine whether to block and/or transmit the traffic, based on comparing an amount of traffic associated with the rules and a random number, as described below. In some implementations, user equipment 205 may block traffic by preventing the traffic from being transmitted, by delaying transmission of the traffic, or the like.

In some implementations, user equipment 205 may identify an amount, such as a percentage, associated with blocking or transmitting foreground traffic and/or background traffic based on the application category of the application requesting the transmission. In some cases, the percentage may indicate a percentage of the aggregated foreground traffic and/or the aggregated background traffic associated with an application category that the network operator is blocking or transmitting (e.g., to reduce network congestion). For example, user equipment 205 may identify that the rules indicate that the network operator is blocking twenty percent (e.g., 20% block) of foreground traffic and is not blocking background traffic (e.g., zero percent (0%) block).

In some implementations, user equipment 205 may generate a random number (e.g., by using a random number generator) between two numbers (e.g., between zero and 100, between zero and one, etc.). User equipment 205 may compare the random number and the amount, such as a percentage, associated with the foreground traffic and/or the background traffic (e.g., depending on whether the traffic is foreground traffic or background traffic). In some cases, where the comparison indicates that the random number is less than the amount, user equipment 205 may block the foreground traffic and/or the background traffic of the application. In some implementations, however, where the amount is zero, such as zero percent, or 100%, user equipment 205 may not compare the random number and the amount, which may conserve processor resources by eliminating the comparison.

For example, assume that the traffic is foreground traffic, that user equipment 205 generates a random number of 18, and that the amount for foreground traffic is 20 percent. User equipment 205 may compare the random number 18 and the percentage 20. In this case, the comparison may indicate that the random number is less than the percentage associated with the foreground traffic. Based on the comparison, user equipment 205 may block the foreground traffic associated with the application.

In some implementations, user equipment 205 may block or transmit the traffic based on the application category, without determining whether the traffic is foreground traffic or background traffic. For example, a single percentage may be associated with the application category, rather than two percentages, where a first percentage is associated with foreground traffic and a second percentage is associated with background traffic. Assume that the amount is 80 percent for the application category. In this case, user equipment 205 may not determine whether the traffic is foreground traffic or background traffic and may block 80 percent of the traffic associated with the application category by comparing the random number and the percentage, as described above.

In some implementations, user equipment 205 may use the rules after receiving a prompt or a request from the network, such as when network congestion satisfies a threshold. For example, user equipment 205 may receive and store the rules from the network, such as when user equipment 205 initially connects to the network or when user equipment 205 receives a broadcast of the rules from the network. In some implementations, user equipment 205 may use the rules when the network notifies user equipment 205 to use the rules, such as when user equipment 205 receives a notification from the network that the network congestion has satisfied a threshold.

In some implementations, user equipment 205 may use the rules at specific times of the day, the week, or the like. For example, user equipment 205 may use a first set of rules for evening hours and/or night hours (e.g., 6:00 pm to 9:00 pm), a second set of rules for weekends (e.g., Saturday and Sunday), or the like.

In this way, network resources are conserved by preventing the transmission of traffic, such as when network congestion satisfies a threshold. Additionally, processor resources of a user equipment are conserved by not transmitting traffic that the user equipment would otherwise transmit.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
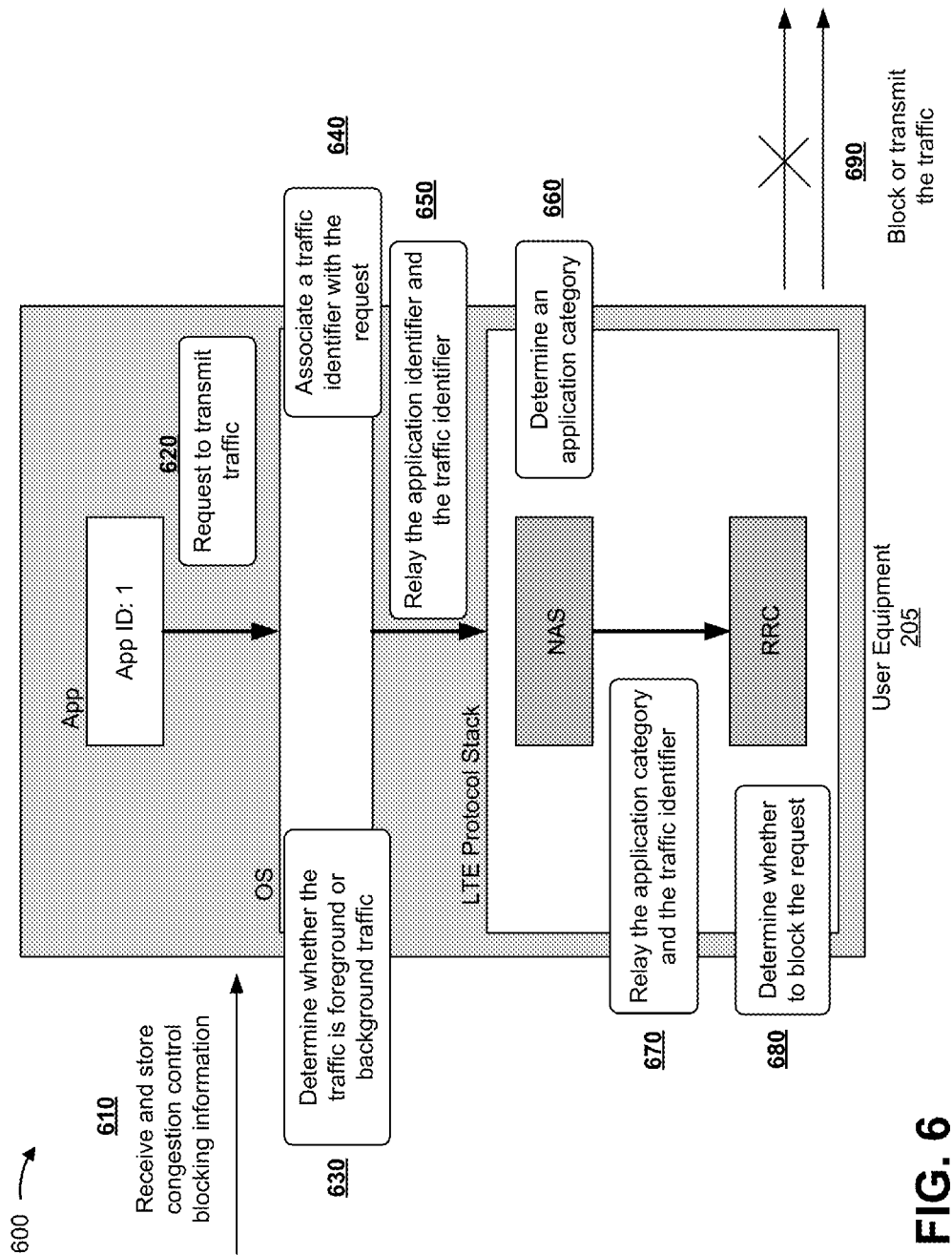
FIG. 6 is a diagram of an example implementation relating to the example process shown in FIG. 5.

FIG. 6 is a diagram of an example implementation 600 relating to example process 500, shown in FIG. 5. As shown in FIG. 6, and by reference number 610, user equipment 205 may receive and store congestion control blocking information, such as rules associated with blocking traffic. The user equipment may receive the congestion control blocking information from the EPS via base station 210 (not pictured) as part of an LTE system information block. In some cases, the congestion control blocking information may be accessible via a radio resource control (RRC) component associated with user equipment 205, as described below.

As shown by reference number 620, an application ("App") associated with user equipment 205 may request to transmit traffic. The application may be associated with an application identifier ("App ID") (e.g., shown as "1"). As shown by reference number 630, an operating system ("OS") associated with user equipment 205 may determine whether the traffic associated with the request is foreground traffic or background traffic.

As shown by reference number 640, the OS may associate a traffic identifier (e.g., a value, such as a number, a string, etc.) with the request after determining whether the traffic is foreground traffic or background traffic. In some implementations, when the OS determines that the traffic is foreground traffic, the OS may associate a foreground traffic identifier with the request. Alternatively, when the OS determines that the traffic is background traffic, the OS may associate a background traffic identifier with the request.

As shown by reference number 650, the OS may relay the application identifier and the traffic identifier with the request to an LTE protocol stack (e.g., an E-UTRAN protocol stack), which may include a non-access stratum (NAS) component and an RRC component. As shown by reference number 660, the NAS component may determine an application category associated with the application using the application identifier.

As shown by reference number 670, after determining the application category, the NAS component may relay the application category and the traffic identifier to the RRC component via a NAS message. As shown by reference number 680, the RRC component may determine whether to block the request using the application category and/or the traffic identifier. As shown by reference number 690, user equipment 205 may block or transmit the traffic based on the RRC component determining whether to block the request.

In this way, user equipment 205 may block and/or transmit traffic, such as foreground traffic and/or background traffic, using congestion control blocking information associated with an application category of an application. This may conserve network resources by preventing transmission of the traffic when, for example, network congestion on a network satisfies a threshold. Additionally, processor resources of user equipment 205 are conserved by not transmitting traffic that the user equipment would otherwise transmit.

As indicated above, FIG. 6 is provided as an example. Other examples are possible and may differ from what was described with regard to FIG. 6.

Implementations described herein may enable a user equipment to selectively block and/or transmit traffic based on a set of rules. This may conserve network resources by blocking the transmission of traffic, such as when network congestion satisfies a threshold. In addition, this may reduce network congestion, increase a quality of service of the network, and increase a performance of the network (e.g., reduce packet loss), by preventing the transmission of traffic via the network. Additionally, this may conserve processor resources of the user equipment by preventing the transmission of traffic when the user equipment otherwise would have transmitted the traffic.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
  receive a request for a transmission of traffic from an application, the application being associated with an application identifier;
  determine an application category of the application using the application identifier associated with the application;
  identify a set of rules associated with the application category,
    where the set of rules includes at least one of:
      one or more rules associated with foreground traffic, or
      one or more rules associated with background traffic;
  determine a value relating to the transmission of traffic for the application category;
  generate a random number;
  compare the random number and the value; and
  selectively block or permit the transmission of traffic, from the application, based on the set of rules and based on comparing the random number and the value.

2. The device of claim 1, where the one or more processors, when selectively blocking or permitting the transmission of traffic, are to:
  block the transmission of traffic, from the application, when the set of rules indicates blocking all of the transmissions of traffic associated with the application category.

3. The device of claim 1, where the one or more processors, when selectively blocking or permitting the transmission of traffic, are to:
  permit the transmission of traffic, from the application, when the set of rules indicates blocking none of the transmissions of traffic associated with the application category.

4. The device of claim 1, where the one or more processors, when selectively blocking or permitting the transmission of traffic, are to:

determine that the transmission of traffic is a transmission of foreground traffic or a transmission of background traffic;
identify, for the application category, a first value relating to the transmission of foreground traffic or a second value relating to the transmission of background traffic; and
where the one or more processors, when comparing the random number, are to:
compare the random number and the first value or the second value to obtain a result; and
selectively block or permit the transmission of foreground traffic or the transmission of background traffic based on the result.

5. The device of claim 1, where the one or more processors are further to:
determine that the transmission of traffic is a transmission of foreground traffic, and where the one or more processors, when identifying the set of rules, are to:
identify a rule, associated with the application category, of the one or more rules associated with the foreground traffic.

6. The device of claim 1, where the one or more processors are further to:
determine that the transmission of traffic is a transmission of background traffic, and where the one or more processors, when identifying the set of rules, are to:
identify a rule, associated with the application category, of the one or more rules associated with the background traffic.

7. A non-transitory computer-readable medium storing instructions, the instructions comprising:
one or more instructions that, when executed by one or more processors, cause the one or more processors to:
receive a request associated with an application installed on a user equipment;
determine whether the request is associated with transmitting, by the application, foreground traffic or background traffic;
determine an application category associated with the application;
determine one or more rules associated with the application category and based on whether the request is associated with transmitting the foreground traffic or the background traffic;
identify a threshold number associated with transmitting the foreground traffic or the background traffic;
generate a random number;
compare the random number and the threshold number; and
selectively block or permit the foreground traffic or the background traffic based on the one or more rules associated with the application category and based on comparing the random number and the threshold number.

8. The non-transitory computer-readable medium of claim 7, where the one or more instructions, that cause the one or more processors to selectively block or permit the foreground traffic or the background traffic, cause the one or more processors to:
block the foreground traffic when the one or more rules indicate that the foreground traffic associated with the application category is to be blocked,
block the background traffic when the one or more rules indicate that the background traffic associated with the application category is to be blocked,
permit the foreground traffic when the one or more rules indicate the foreground traffic associated with the application category is to be permitted, or
permit the background traffic when the one or more rules indicate the background traffic associated with the application category is to be permitted.

9. The non-transitory computer-readable medium of claim 7, where the one or more instructions, that cause the one or more processors to selectively block or permit the foreground traffic or the background traffic, cause the one or more processors to:
delay transmission of the foreground traffic or the background traffic.

10. The non-transitory computer-readable medium of claim 7, where the application category is associated with at least one of:
a network operator identification,
a purpose of the application,
a data size of the foreground traffic or the background traffic associated with the application, or
an importance level of the application.

11. The non-transitory computer-readable medium of claim 7, where the one or more instructions, that cause the one or more processors to determine the application category associated with the application, cause the one or more processors to:
identify an application identifier that identifies the application; and
compare the application identifier and a set of application identifiers,
where the set of application identifiers is associated with one or more corresponding identifiers that identify the application category.

12. A method, comprising:
determining, by a user equipment, that an application has traffic to transmit,
the application executing on the user equipment,
the traffic being foreground traffic or background traffic;
identifying, by the user equipment, a category of the application;
identifying, by the user equipment, a first rule and a second rule associated with the category of the application,
the first rule being associated with the foreground traffic, and
the second rule being associated with the background traffic;
generating, by the user equipment, a random number;
comparing, by the user equipment, the random number and a first number associated with the first rule or a second number associated with the second rule; and
determining, by the user equipment, whether to block:
the foreground traffic based on the first rule and based on comparing the first number to the random number, or
the background traffic based on the second rule and based on comparing the second number to the random number.

13. The method of claim 12, where determining whether to block comprises:
determining that the first rule and the second rule indicate that the foreground traffic and the background traffic are to be blocked; and blocking the foreground traffic and the background traffic based on the first rule and the second rule indicating that the foreground traffic and the background traffic are to be blocked.

14. The method of claim 12,
where the first number and the second number are different; and
where the method further comprises:
    determining whether the traffic is foreground traffic or background traffic; and
    determining that the traffic is to be blocked when a result of comparing the random number indicates that the random number satisfies:
        the first number when the traffic is foreground traffic, or
        the second number when the traffic is background traffic.

15. The method of claim 12,
where the first number and the second number are different; and
where the method further comprises:
    determining whether the traffic is foreground traffic or background traffic; and
    determining that the traffic is not to be blocked when a result of the comparison indicates that the random number does not satisfy:
        the first number when the traffic is foreground traffic, or
        the second number when the traffic is background traffic.

16. The method of claim 12, where the foreground traffic is at least one of:
    traffic initiated by a user of the application and via the application,
    traffic initiated via the application when a screen lock or a keypad lock of the user equipment is deactivated,
    traffic initiated via the application when a length of time, since the user of the user equipment has interacted with the user equipment or the application, fails to satisfy a threshold length of time, or
    traffic initiated via the application when the application is open on the user equipment.

17. The method of claim 12, where the background traffic is at least one of:
    traffic initiated via the application and caused by a network to which the user equipment is connected,
    traffic initiated by the application without user input,
    traffic initiated via the application when a screen lock or a keypad lock of the user equipment is activated,
    traffic initiated via the application when a length of time, since a user of the user equipment has interacted with the user equipment or the application, satisfies a threshold length of time,
    traffic initiated via the application when the application is closed on the user equipment, or
    traffic initiated via the application corresponding to a type of traffic that the user equipment restricts when background traffic transmissions are disabled on the user equipment.

18. The device of claim 1, where the value comprises a percentage of at least one of the background traffic or the foreground traffic to be transmitted.

19. The non-transitory computer-readable medium of claim 7, where the threshold number comprises a percentage of the background traffic or the foreground traffic to be transmitted.

20. The non-transitory computer-readable medium of claim 7, where the one or more instructions, that cause the one or more processors to determine whether the request is associated with transmitting the foreground traffic or the background traffic, cause the one or more processors to:
    determine that the request is associated with transmitting the foreground traffic based on determining that the request is associated with user-initiated traffic.

* * * * *